US012553911B2

(12) United States Patent
Blank et al.

(10) Patent No.: US 12,553,911 B2
(45) Date of Patent: Feb. 17, 2026

(54) CONSUMABLE FOR SAMPLE PROCESSING IN AUTOMATED ANALYSER

(71) Applicant: STRATEC SE, Birkenfeld (DE)

(72) Inventors: Rouven Blank, Birkenfeld (DE); Andreas Meyer, Birkenfeld (DE); Martin Trump, Birkenfeld (DE); Ralf Wolf, Birkenfeld (DE); Michael Schmid, Birkenfeld (DE)

(73) Assignee: STRATEC SE, Birkenfeld (DE)

( * ) Notice: Subject to any disclaimer, the term of this patent is extended or adjusted under 35 U.S.C. 154(b) by 501 days.

(21) Appl. No.: 18/125,495

(22) Filed: Mar. 23, 2023

(65) Prior Publication Data

US 2023/0305032 A1 Sep. 28, 2023

(30) Foreign Application Priority Data

Mar. 25, 2022 (LU) ........................................ 102921

(51) Int. Cl.
*G01N 35/02* (2006.01)
*B01L 3/00* (2006.01)

(52) U.S. Cl.
CPC ........ *G01N 35/025* (2013.01); *B01L 3/50853* (2013.01); *B01L 2300/041* (2013.01); *B01L 2300/12* (2013.01)

(58) Field of Classification Search
CPC ........... B01L 3/50853; B01L 2300/041; B01L 2300/12; B01L 2200/025; B01L 3/50851; B01L 2200/0689; B01L 2300/042; B01L 2300/045
See application file for complete search history.

(56) References Cited

U.S. PATENT DOCUMENTS

| | | | | |
|---|---|---|---|---|
| 5,817,522 | A | 10/1998 | Goodman | |
| 9,841,360 | B1 | 12/2017 | Solazzi | |
| 2013/0309679 | A1* | 11/2013 | Ismagilov | B01L 3/5027 435/6.12 |
| 2021/0292311 | A1 | 9/2021 | Craig et al. | |

FOREIGN PATENT DOCUMENTS

| | | | |
|---|---|---|---|
| EP | 3964292 | A1 | 3/2022 |

* cited by examiner

*Primary Examiner* — Benjamin R Whatley
(74) *Attorney, Agent, or Firm* — William Gray Mitchell

(57) ABSTRACT

A consumable which is a device intended for single use comprising a cavity for receiving a liquid. The disclosure provides a consumable for use in an automated analyser system for performing biochemical assays, comprising a rim surrounding at least one cavity for receiving a fluid, wherein the at least one cavity is connected via a flexible bridge to the rim; and a cover foil that is arranged on top of the consumable and above the openings of the at least one cavity, wherein the cover foil comprises holes which are configured to be arranged in an open position above the openings of all cavities, wherein the cover foil is connected rotatable at and around a centrally arranged hole.

17 Claims, 9 Drawing Sheets

FIG. 11A
FIG. 11B
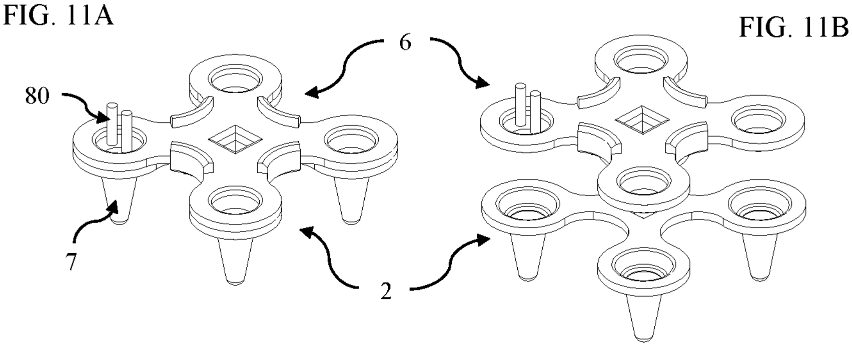
FIG. 11C
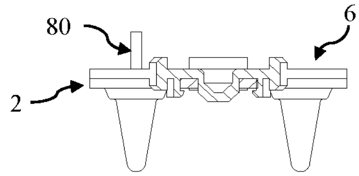
FIG. 12A
FIG. 12B
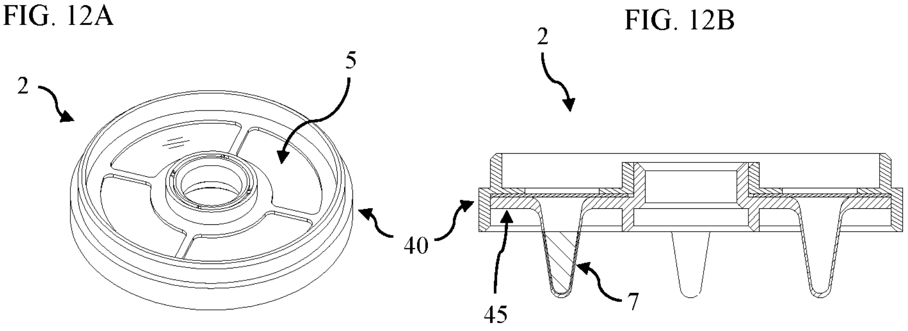
FIG. 13A
FIG. 13B
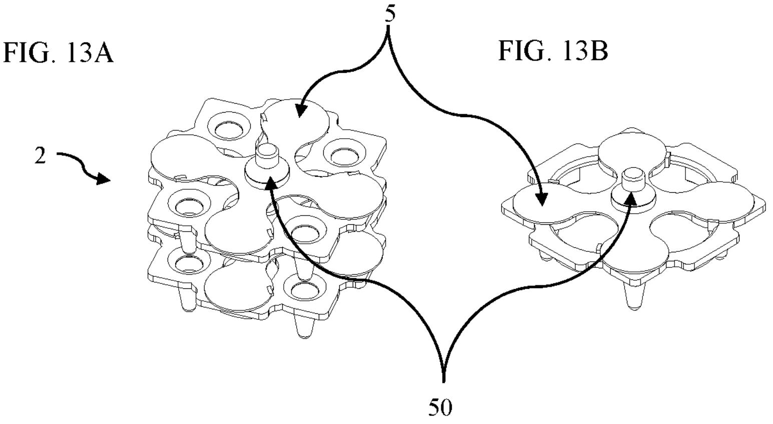

CONSUMABLE FOR SAMPLE PROCESSING IN AUTOMATED ANALYSER

CROSS-REFERENCE TO RELATED APPLICATION

The present application claims priority to Luxembourg Patent Application No. LU 102921 filed on Mar. 25, 2022. The aforementioned application is hereby incorporated by reference in its entirety.

BACKGROUND OF THE DISCLOSURE

Field of the Invention

The disclosure relates to a consumable which is a device intended for single use comprising a cavity for receiving a liquid.

Brief Description of the Related Art

Automated analyser systems for use in clinical diagnostics and life sciences are produced by a number of companies. For example, STRATEC SE, Birkenfeld, Germany, produces a number of devices for specimen handling and detection for use in automated analyser systems and other laboratory instrumentation.

For performing a so-called polymerase chain reaction (PCR) process, whether real-time PCR or quantitative PCR, always a consumable, which is device intended for single use comprising a cavity for receiving a liquid like a liquid sample from a patient is required for handling of such a liquid. This consumable comprises besides a cavity a kind of a sealing element, like a cap or a foil. Consumable and sealing must be stored and finally combined in a further process so that the cavity of the consumable is sealed.

A defined number of steps needs to be performed in order to prepare a liquid sample comprised in a consumable prior to performing a PCR process. In order to avoid a liquid loss during the repeated cycles of heating and cooling of the sample the cavity must be sealed air tight. In the context of the present disclosure, the complete preparation process comprises at least the following steps:

- Loading of stacked PCR consumables;
- Separation and supply of consumables;
- Preparation of reaction sample comprising filling and mixing of liquids into the consumable using a pipettor;
- Closing and sealing of the consumable;
- Transferring the consumable to centrifuge using a gripper;
- Centrifugation of the consumable for bubble removal and sample positioning;
- Transferring the consumable to a real-time thermocycler using a gripper; and
- Performing a real-time PCR (thermal cycling and fluorescence measurement) of the reaction sample.

There are certain different systems for PCR sample preparation known from the prior art. One example relates to a PCR consumable comprising individual PCR caps and PCR tubes which are provided together in a plastic storage box or in a blister packaging. The consumable tubes and caps are for example arranged next to each other in a storage box. It is possible to process the liquids in the tubes of the storage box. A vial gripper can take a cap and snap it onto a tube for closing or sealing it.

Another solution from the state of the art for preparing samples prior to performing a PCR relates to a PCR plate comprising 384 wells which are firmly integrated in a frame.

Such plates are usually used in batch processing applications. Said system may use different vial or well geometries with a round and flat bottom shape. The wells will be sealed with a heat sealer after liquid handling for closing and sealing all wells arranged in a frame. There are also other sealing technologies available like a pressure sensitive glue or a sealing using an ultrasonic welding process.

A disadvantage of nearly all existing solutions for preparing samples for PCR by sealing wells or cavities refers to using several single parts which must be handled and stored in additional steps separately.

Known solutions using only a single part have the disadvantage that the cavities of the consumables will have to be sealed manually. A fully automatic closing would increase the complexity and reliability of such systems.

There are also consumables available which refer to the use of a microfluidic device or a microfluidic chip. Such a microfluidic chip has a complex structure and therefore manufacturing of microfluidic devices is by far more complex and expensive in comparison to other designs.

Published European patent application EP 3 964 292 A1 relates to an enclosed unit for biological sample processing comprising a support with a housing for receiving a reaction tube containing a biological sample to process and guide means movable with respect to the support, so that said displacement pulls out a protruding plug of the reaction tube placed in the housing of the support and allows a reagent to fall into the reaction tube. It is disadvantageous that a device according to EP 3 964 292 A1 requires a separate reaction tube with a protruding plug. The device of EP 3 964 292 A1 is intended for handling reaction tubes and does not provide a reaction tube itself which can be sealed and opened in a simple way.

Published U.S. Pat. No. 9,841,360 B1 discloses a sample analysis cup assembly, system and method for purging including a cell body, including a top end; a bottom end; a cell body wall extending axially from the top end to the bottom end; a transverse wall adjacent the top end, including a plurality of apertures extending therethrough; and a raised portion on the transverse wall including a central aperture extending therethrough; a rotatable cap, including a top surface; a bottom surface; and a series of apertures extending from the top surface through the bottom surface, the rotatable cap being structured to engage with the top end of the cell body; and a ring member structured to couple with the bottom end of the cell body are provided.

There is a need for a device and a method for preparing samples for an analytical assay like a PCR which is fast and easy to handle with respect to sealing a cavity comprising a liquid sample.

SUMMARY OF THE DISCLOSURE

The present disclosure provides a consumable for use in an automated analyser system for performing biochemical assays, comprising a rim surrounding at least one cavity for receiving a fluid, wherein the at least one cavity is connected via a flexible bridge to the rim; and a cover foil that is arranged on top of the consumable and above the openings of the at least one cavity, wherein the cover foil comprises holes which are configured to be arranged in an open position above the openings of all cavities, wherein the cover foil is connected rotatable at and around a centrally arranged hole.

The at least one cavity can be made of a white or translucent material in another embodiment of the disclosure.

A further aspect of the disclosure relates to the cover foil which can be made of a translucent material.

It is further intended that the at least one cavity can be made of a thermally conductive material.

The consumable may in another embodiment comprise a centrally arranged hole which is configured to accommodate a gripper for taking up the consumable with an alignment cone.

It is further envisaged that the bridges are configured to allow a horizontal and/or vertical movement of the cavities.

Another embodiment relates to a cover foil which may have additional holes configured to accommodate spikes of a rotation gripper for rotating the cover foil from an open position to a closed position where the cover foil closes the opening of the at least one cavity.

A further aspect of the disclosure relates to the consumable, wherein the upper end of the cavities' openings comprise a raised border made of a heat meltable material.

The foil of a consumable according to the present disclosure can made of a heat meltable material, is coated with an adhesive or glue on the surface directed towards the cavities' openings.

Another aspect of a consumable relates to the rim which may comprise a snap-in feature comprising a retaining element at the bottom side of the rim and a hook arranged above the retaining element and thus above the rim.

Another object of the present disclosure is a system for performing biochemical assays, comprising At least one consumable as described above; and An automated analyser system with an element providing recesses configured to receive the cavities of a consumable as described above.

In another aspect of the instant disclosure's system, the glass fibres are arranged above each cavity for introducing light into the respective cavity.

It is further intended for a system according to the present disclosure that it comprises a rotation gripper with spikes which are configured to accommodate into additional holes of the cover foil for rotating the cover foil from an open position to a closed position and vice versa.

The system may comprise in another embodiment a member for sealing the cover foil onto the consumable, which can be a heating element.

It is also envisaged that the system can comprise a gripper for moving a consumable, wherein the gripper comprises an interface pin which is arranged centrally in a strip-off-shell.

The interface pin of a system according to the present disclosure may further comprise a rotation lock, which can be flattened longitudinal surfaces on the interface pin.

Still other aspects, features, and advantages of the present disclosure are readily apparent from the following detailed description, simply by illustrating preferable embodiments and implementations. The present disclosure is also capable of other and different embodiments and its several details can be modified in various obvious respects, all without departing from the spirit and scope of the present disclosure. Accordingly, the drawings and descriptions are to be regarded as illustrative in nature, and not as restrictive. Additional objects and advantages of the disclosure will be set forth in part in the description which follows and in part will be obvious from the description, or may be learned by practice of the disclosure.

BRIEF DESCRIPTION OF THE FIGURES

The disclosure will be described based on figures. It will be understood that the embodiments and aspects of the disclosure described in the figures are only examples and do not limit the protective scope of the claims in any way. The disclosure is defined by the claims and their equivalents. It will be understood that features of one aspect or embodiment of the disclosure can be combined with a feature of a different aspect or aspects of other embodiments of the disclosure, in which:

FIGS. 11A-11C show a cruciform embodiment of a consumable.

FIGS. 12A-12B show an embodiment of a consumable with an additional frame.

FIGS. 13A-13B show a multi cavity consumable which has an integrated cover foil.

DETAILED DESCRIPTION

Figure 1:
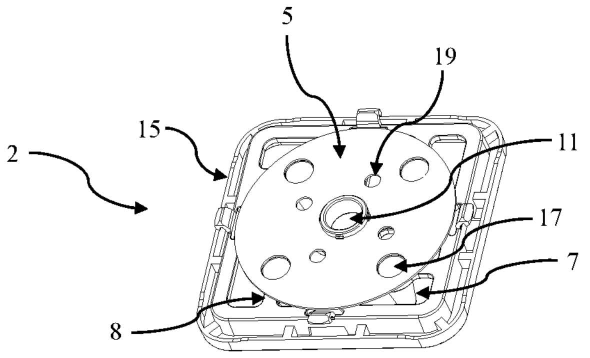
FIG. 1 shows a consumable according to the disclosure.

The technical problem is solved by the independent claims. The dependent claims cover further specific embodiments of the disclosure.

The term consumable refers within the present disclosure to a device which provides cavities, receptacles or recesses for receiving a fluid which can be a liquid patient sample for instance. The term fluid refers to a liquid which can be a patient sample that comprises solids. A patient sample may be liquids like whole blood, urine, lymph or saliva.

The present disclosure comprises a disposable consumable with multiple reaction cavities. Such a consumable is intended for single use only for performing an analytical assay like a PCR. It is obvious for a person having ordinary skill in the art that the consumable according to the present disclosure may also be used for other assays and is thus not limited to its use in PCR.

The consumable according to the present disclosure comprises an integrated sealing element, which can be heat sealed or welded to obtain air-tight sealed reaction cavities. The consumable is furthermore stackable for minimizing the required space. The sealing element can be closed and subsequently sealed with a heat-sealing device for obtaining the air-tight sealed cavities. It is an advantage of a consumable according to the present disclosure that no other elements than the consumables with its already connected parts must be handled.

A relevant feature of the present disclosure relates to the integrated heat-sealing element that allows stacking of the consumable as well as sealing of multiple cavities. This sealing element safeguards further processing and avoids evaporation of the liquids in the cavity as well as contamination of said liquids.

The present disclosure provides a new consumable design and sample preparation process prior to performing an assay like a PCR. The consumables according to the instant disclosure is stackable and relate to a multi-cavity consumable with preferably four cavities. It is obvious that consumable with a different number of cavities for receiving a liquid also within the scope of the present disclosure.

As already mentioned, the consumables provide an integrated sealing element which is a foil thin sheet of a material that is suitable heat-sealing or welding to cover the cavity inside the instrument while offering the possibility to open the cavities before heat sealing or welding for adding a liquid to a cavity. The cavities will be air-tight sealed when the respective liquid or multiple liquids have been filled into a cavity.

The consumables according to the present disclosure further comprises structural elements enabling handling of the consumable with a simple gripper. The structural element is a circular hole for accommodating a gripper.

It is further intended that the cover or seal of the cavities is made of a translucent material for enabling fluorescence measurement at least through a window made of a translucent material in the cover or seal. It is also within the scope of the present disclosure to use a translucent and thin sealing element allowing to measure fluorescence. The walls of the cavity may also be made of a translucent material or alternatively of a white material for enhancing emitted fluorescence, respectively for reflecting optical signals resulting from emitted fluorescence.

The consumables 2 for assay preparation according to the present disclosure comprises an integrated and rotatable cover which is a cover foil 5 or can be a plate (comp. FIG. 1). The cover foil 5 may be made of a transparent or translucent material or can be made in another embodiment of a solid or rigid material. The consumable 2 has on its outside a surrounding stable rim 15 for handling, stacking and unstacking of consumables 2. The cover foil 5 has holes 17 which are arranged in an open position above the openings of cavities 7 so that a liquid may be added to a cavity. The foil has further holes 19 for rotating the foil. In an embodiment of the consumable, the cavities are made of a white material and will be covered with a clear (translucent) foil to support fluorescence measurement. An alternative design for the consumable is a cavity with a frosted surface and clear wells. An alternative material can be a thermally conductive plastic or a material compound comprising a metal and plastic foil (e.g. blister packaging).

The consumable 2 further provides a centrally arranged hole 11 for taking up the tip of a gripper so that the consumable can be moved (comp. FIG. 1).

Figure 2:
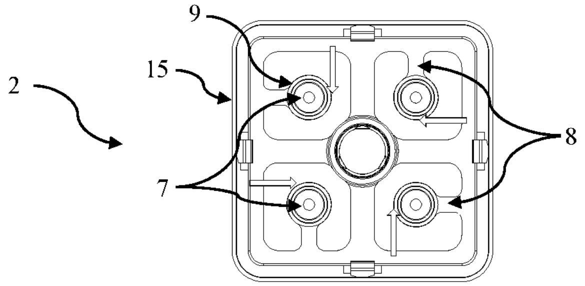
FIG. 2 shows schematically the bridges for connecting each consumable with the rim.

Each of the separate cavities 7 is fixed through a bridge 8 to the rim 15 (comp. FIG. 1, FIG. 2). The cavities 7 can be moved in a limited degree, because the bridges 8 allows for a limited movement which is indicated by the arrows in FIG. 2. A design for each of the four cavities as shown in the embodiments in FIG. 1 and FIG. 2 provides and guarantees a tolerance compensation in x-, y-, and also in z-direction.

The tolerance compensation is in particular required for use of the consumable with cavities in a thermocycler because it is necessary that the consumable fits exactly in the thermo unit, respectively the cavities providing the surfaces for transferring thermal changes to the cavities of the consumable. Appropriate heat transfer can only be guaranteed if the side walls of the cavities are in tight contact with the surfaces of the heating and cooling element.

Light can be introduced into the cavities through a first light guiding fiber 80 arranged above each cavity and emitted fluorescent light can be absorbed by a second light guiding fiber 80. Due to the thin foil and the consumable design, it is possible to bring the glass fibers as close as possible to the fluid surface to get the best readout (comp. FIGS. 11A-11C).

Figure 3A:
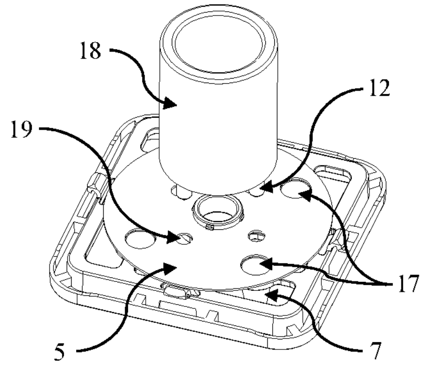
FIGS. 3A-3B show in FIG. 3A a consumable with open cavities and in FIG. 3B a device for rotating the foil to close the cavities.
Figure 3B:
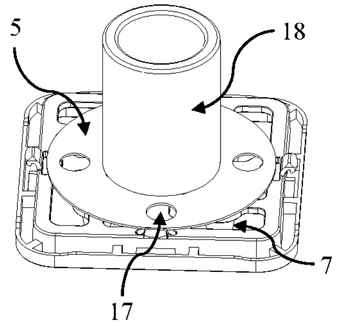

The cover foil 5 can be rotated and thus allows for closing all cavities simultaneously. FIG. 3A shows a consumable with holes 17 arranged above the openings of cavities 7 so that the cavities are open and may receive a liquid. FIG. 3B shows a rotation gripper 18 that engaged with spikes 12 into openings 19 of the cover foil 5 for rotating it so that all cavities are closed. Following rotation and closing of the cavities 7, the cover foil 5 has to be sealed (e.g., by heat) onto the upper end of the cavities openings 7 which may be surrounded by a raised border 9 so that this raised border can be configured to melt during heating of cover foil 5 for obtaining an airtight sealing of the cavities.

Figure 4:
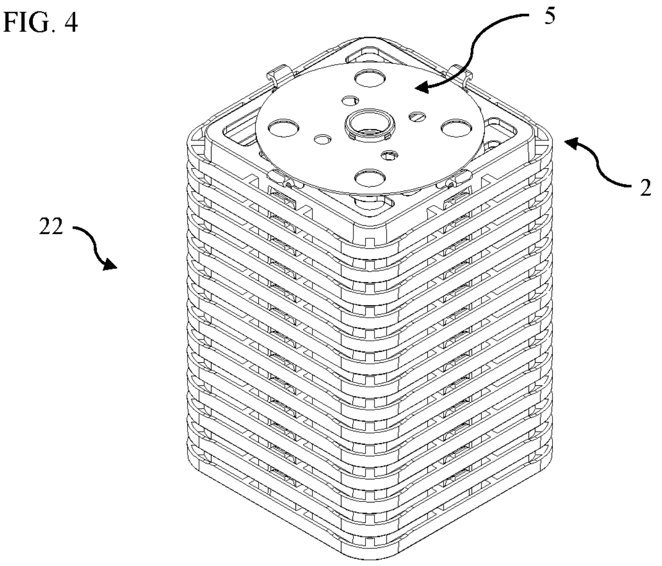
FIG. 4 shows a stack of consumables.
Figure 5:
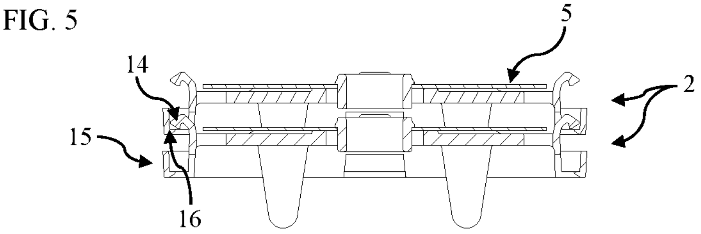
FIG. 5 shows in a sectional view two stacked consumables.

FIG. 4 shows a stack 22 of consumable 2 with cover foil 5 according to the present disclosure which is stackable. FIG. 5 shows in a sectional view exemplary two stacked consumables 2 with cover foil 5. Rim 15 has a snap-in feature comprising a retaining element 16 which can be formed like an edge at the bottom side of the rim 15 and a hook 14 extending from the upper side of rim 15 so that the hook 14 of a lower consumable snaps into the retaining element 16 of the above arranged consumable.

Figure 6A:
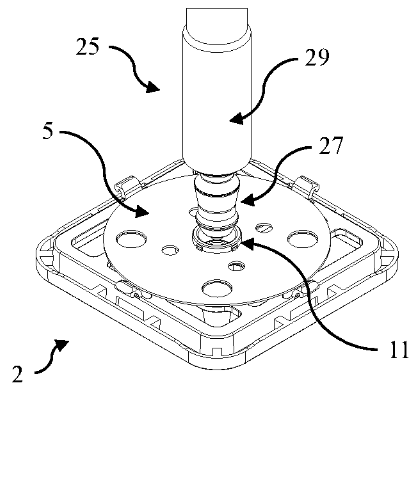
FIGS. 6A-6B show a gripper for handling a consumable.
Figure 6B:
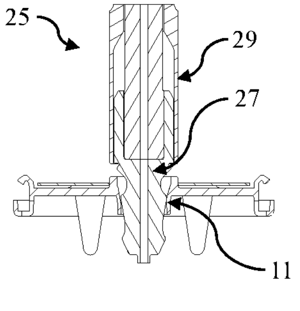

The consumables can be handled via a gripper 25 comprising an interface pin 27 for engaging into hole 11 and a strip-off-shell 29 for setting down or placing down the consumable 2 with cover foil 5 (comp. FIGS. 6A-6B). The interface pin 27 can plug into the hole 11 for the gripper 25. The tip of interface pin 27 can be formed conically (comp. FIG. 6B) and acts as an alignment cone for centrally arranging the interface pin 27 in the consumable 2 for achieving a form fit connection between interface pin 27 and consumable 2. The picked-up consumable 2 can be transported inside the automated analyser system, loaded or unloaded from the automated analyser system. To eject the consumable 2 at its final destination, the protruding interface pin 27 can be moved upwards into the strip-off shell 29 in order to strip-off the consumable 2 (FIG. 6B).

Figure 7:
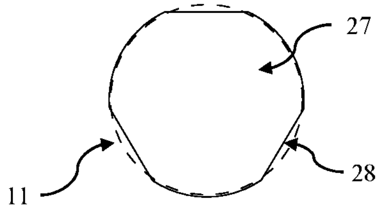
FIG. 7 shows the interface pin in more detail.

The interface pin 27 provides a rotation lock to avoid an unintentional twisting, turning, or rotating of the consumable during handling. The anti-rotation function of the interface pin 27 is realized by three or more flattened longitudinal surfaces 28 which are arranged at the outer circumference of the interface pin 27 (comp. FIG. 7). During the vertical downwards movement of the gripper the interface pin 27 enters the centrally arranged hole 11 of the consumable which circumference is indicated by the dotted line in FIG. 7 and deforms the centered hole 11 for generating form fitting connection avoiding any rotational movements of the consumable around interface pin 27.

Figure 8:
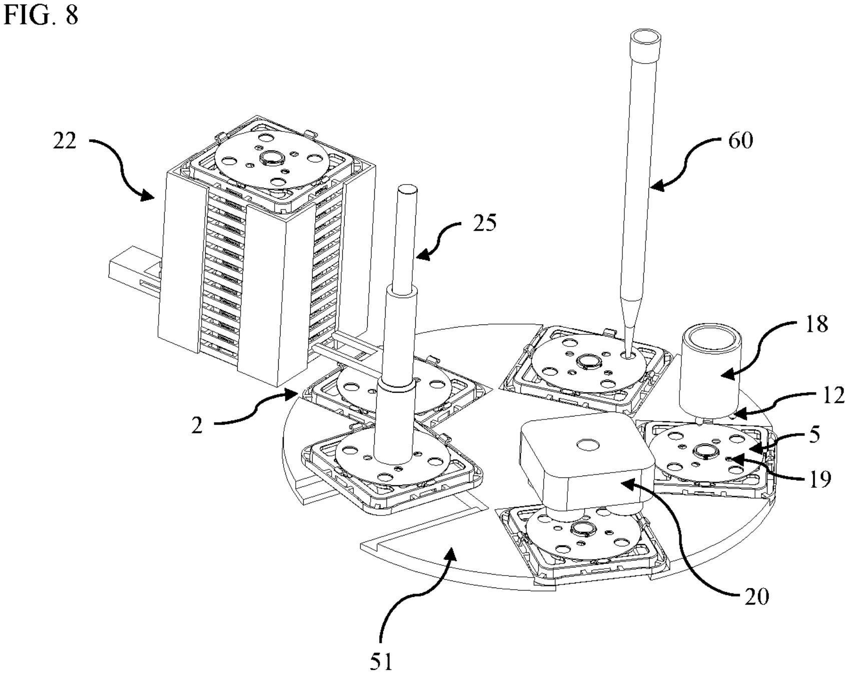
FIG. 8 shows an exemplary setup for supply and preparation of the specific PCR consumables.

Different steps are necessary for the whole sample preparation process like a PCR. FIG. 8 shows an exemplary setup for supply and preparation of the consumables 2 for a PCR. A consumable 2 is separated from a stack of consumables 22 and loaded onto a circular shaped processing unit 51. After loading of consumable 2, the disc shaped processing unit 51 turns by one position so that an empty position for loading of the next consumable is rotated next to the stack of consumables 22 and the loaded consumable 2 is rotated to a pipetting position so that a pipette 60 can fill the respective cavities with a liquid. The disc shaped processing unit 51 is moved by a further position so that the consumable 2 with liquid filled cavities reaches a closing position. Rotation gripper 18 engages with spikes 12 into openings 19 of the cover foil 5 for rotating it so that all cavities are closed after rotation of the cover foil 5. Processing unit 51 rotates again by one position so that the consumable with closed cavities is positioned below a heating element 20 which is pressed onto cover foil 5 for sealing the foil 5 with the upper end of the openings by applying heat and optionally pressure to cover foil 5. The disc shaped processing unit 51 rotates again by one position and consumable 2 is positioned below a gripper 25 which engages into the centrally arranged hole for removing the consumable 2 from the processing unit 51. The empty place in the processing unit 51 is then moved before the stack of consumables 22 so that the process can restart with another consumable 2 which is separated from the stack of consumables 22. It is also possible that this circular preparation process may employ a centrifuge. Thus, bubbles in liquids will be removed by centrifuging from the cavities of the consumables after pipetting the liquid into the cavities. Such a configuration will save a transfer step to a separate centrifuge and the consumables can directly be transported back to the circular shaped processing unit 51 for further processing as described above.

Figure 9:
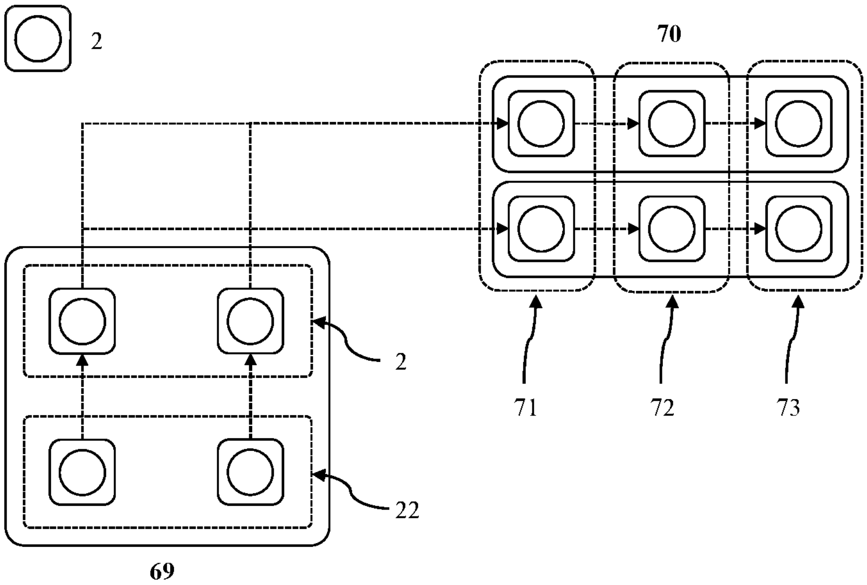
FIG. 9 shows an alternative sample preparation process.
Figure 10A:
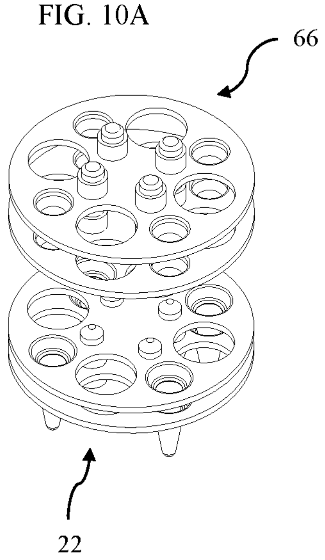
FIGS. 10A-10C show an alternative embodiment of a circular consumable with closable cavities which is stackable.
Figure 10B:
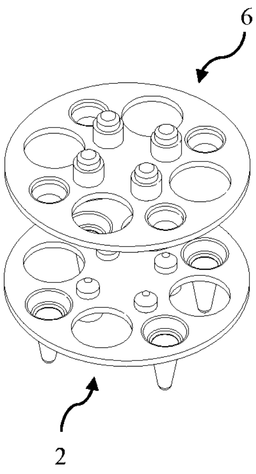
Figure 10C:
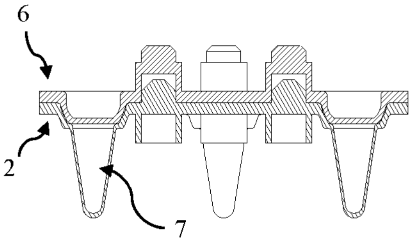

FIG. 9 shows an alternative sample preparation process. This embodiment represents an individual preparation process in contrast to the one depicted in FIG. 8. In a loading unit 69 the consumables 2 are loaded in stacks 22 and then provided individually, respectively single consumables separated from a stack. The individual consumables 2 will be transferred into a pipetting and sealing unit 70 with different processing lines. The processing lines comprise different processing stations such as a loading and pipetting unit 71, a foil turning unit 72 and a sealing unit 73 for each consumable. The consumable is in this case able to pass through the various processing stations independent from other consumables. Additionally, this embodiment comprises a linear movement instead of a rotational movement.

The advantages of the disclosure can be summarized as follows:

- The stackable consumable requires less space during transport and provision to an automated analyser.
- Stacking of the consumable reduces the risk of a contamination of the cavities prior to receiving a liquid.
- The multi-cavity consumable results in lower test costs for small batch sizes.
- Integrated sealing foil makes additional devices for loading, separation and handling of consumable caps redundant.
- A heat sealing process results in air tight closed cavities.
- Heat sealing allows for a fully automatic sealing process inside an automated analyser system.
- No separate device for handling of sealing material required.
- Consumable can be handled with a simple gripper.
- The rotating sealing (foil) enables to close all cavities in parallel.
- Tolerance compensation enables a precise fitting of the cavities inside the thermal cycler device.
- Fluorescence measurements can directly be performed inside the cavities.

Alternative designs of a multi cavity consumable 2 and a cover 6 for sealing are shown in FIGS. 10A-10C and FIGS. 11A-11C. Both designs may have a stackable cover 66 and a stackable consumable 22 (FIG. 10A), wherein a cover 6 can close the cavities 7 of a consumable 2 (FIG. 10B) but is not rotatable on the consumable. The tightness for closing of the cavities will be generated by applying a force from the top onto the cover and thus onto the sealing surface. In both alternatives, the cover 6 or a cover foil 5 (not shown) is not part of the consumable itself and must therefore be handled separately. The designs shown in FIGS. 10A-10C and FIGS. 11A-11C do not belong to the present disclosure.

FIGS. 11A-11C show an embodiment comprising a light guiding fiber 80 for detecting light emission resulting from reactions inside the cavity.

Another design of a multi-well consumable is shown in FIGS. 12A-12B. The cover foil 5 is heat sealed between a frame 40 and a base plate 45 of the consumable 2 comprising the cavities 7 to ensure the best possible optical transparence. The frame 40 with the cover foil 5 can be snapped onto the multi cavity consumable 2.

FIGS. 13A-13B show a multi cavity consumable 2 which has an integrated cover foil 5 like the consumables belonging to the disclosure as described above. The cover foil 5 can also rotate for opening (FIG. 13A) or closing (FIG. 13B) the cavities of a consumable. A consumable 2 according to FIGS. 13A-13B has large handling features 50 for gripping and transporting with another gripper design. The cover foil 5 rotates around the centrally arranged handling feature 50.

Figure 14A:
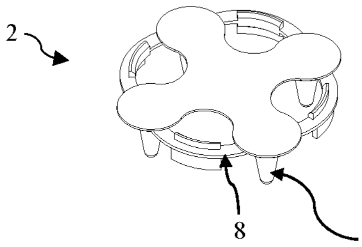
FIGS. 14A-14B show alternative designs for a bridge allowing the connected cavities to move for tolerance compensation.
Figure 14B:
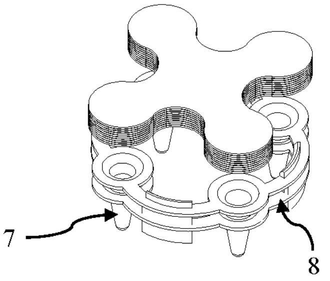

There are also other designs conceivable for obtaining a tolerance compensation between the cavities of a consumable and a rim or supporting frame. FIGS. 14A-14B show alternative designs for a bridge 8 allowing the connected cavities 7 to move for tolerance compensation. The bridges 8 are a kind of part of the rim. The consumable is stackable as can be taken from FIG. 14B.

Figure 15A:
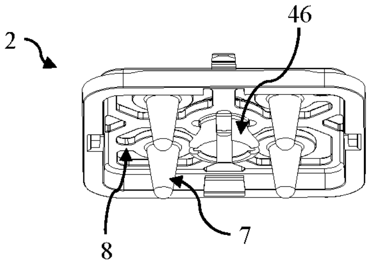
FIG. 15A-15B show an embodiment with self destacking feature.
Figure 15B:
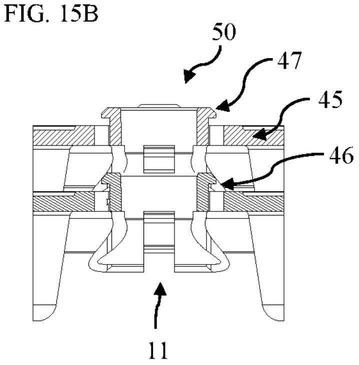

FIGS. 15A-15B show an alternative design of a consumable 2 with bridges 8 connecting cavities 7 to a rim or frame. The consumable 2 has a handling features 50 for a gripper (not shown) which differs from the embodiment shown in FIG. 1. In this alternative embodiment are the snap-fit features for stacking of consumables located at the inner hole 11 comprising a ring 46 below base plate 45 which snaps into a collar 47 located above the base plate 45, wherein both, ring 46 for snap fit and collar 47 surround the centrally arranged hole 11 on the upper or lower end of the hole, respectively. A gripper with rotation lock (not shown) simultaneously grips the upper consumable 2 of a stack of consumables and spreads the clipping feature to release the upper consumable 2.

Figure 16A:
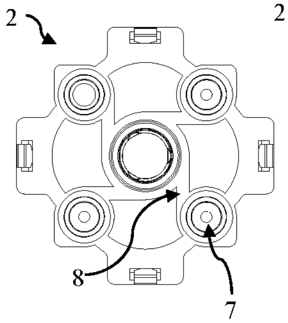
FIGS. 16A-16C show alternative designs for tolerance compensation of cavities.
Figure 16B:
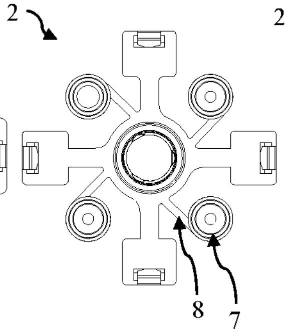
Figure 16C:
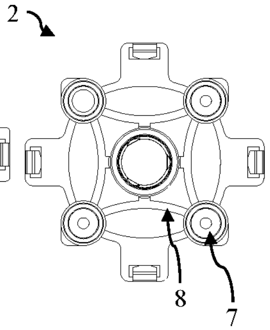

FIGS. 16A-16C show further designs for tolerance compensation of the cavities 7 of a consumable 2 with different embodiments for bridges 8.

There are also other methods conceivable for sealing a consumable with a cover foil without thermo sealing, comprising:

- using a foil with microencapsulated glue that will activated via force;
- ultrasonic welding;
- laser welding;
- heat impulse welding;

wedge welding;
convection welding;
resistance welding;
high frequency welding;
induction welding.

Figure 17:
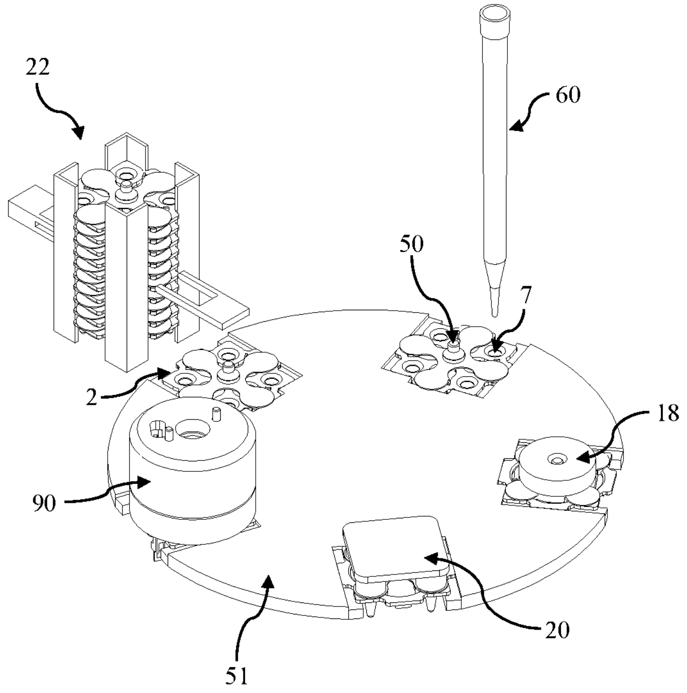
FIG. 17 shows an embodiment of a process using a consumable shown in FIG. 13.

The processing of a consumables 2 with a rotatable cover foil 5 is similar to the processing of a consumables of the present disclosure as shown in FIG. 8. The difference is the rotation of the cover foil 5 via a frictional connection and the different gripper 18 that will be used as can be seen in the right part of FIG. 17. Such a consumable 2 is shown in more detail in FIGS. 13A-13B. In a first step, the consumable 2 is separated from the stack 22 and loaded onto a circular shaped processing unit 51 which rotates by one position to a pipetting position where pipette 60 fills liquids in cavities 7. Processing unit 51 is rotated by a further position so that the consumable 2 reaches a rotating position where cover foil 5 is rotated via a gripper 18 which rotates cover foil 5 by frictional forces so that the openings of a cavity are closed by the tongues of cover foil 5. The next position is used for heat sealing of the cover foil 5 by a heating element 20 to the openings of the cavities. The final position is used for removing the sealed consumable by a removal gripper 90 which engages with the centrally arranged gripping element 50.

Figure 18A:
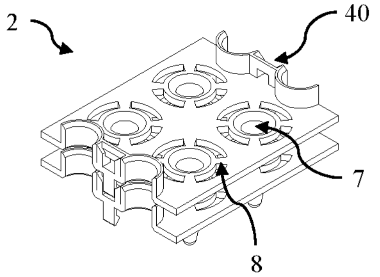
FIGS. 18A-18B shows a consumable that can be loaded and stored into the system without a cover foil or lid.
Figure 18B:
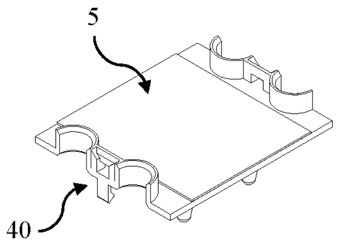

FIGS. 18A-18B show a consumable 2, which may be used for PCR for instance, that can be loaded and stored into the system without a cover foil 5 (FIG. 18A). Within the rectangular design of the consumable's embodiment shown in FIGS. 18A-18B, there are four cavities 7 located. For tolerance compensation, they are connected to the frame 40 by bridges 8.

Figure 19:
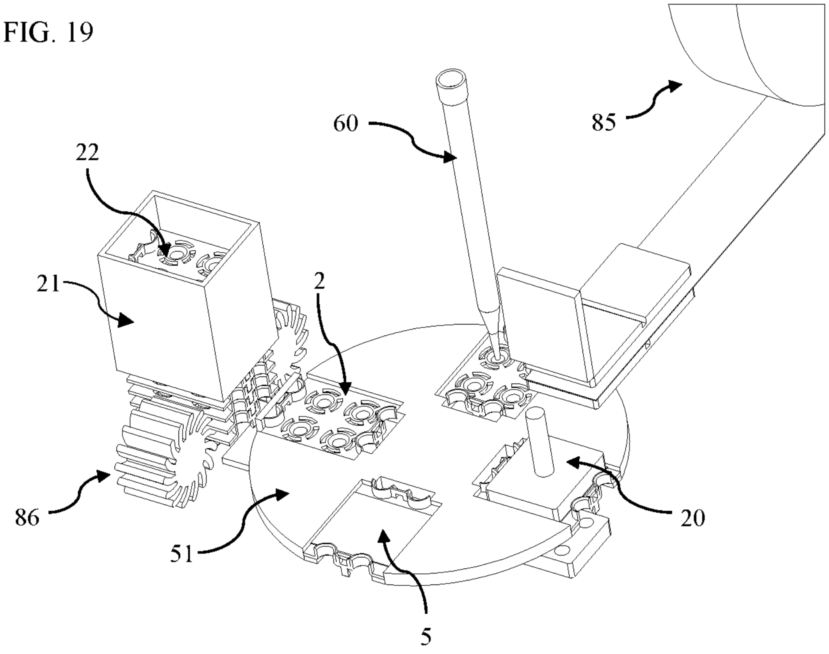
FIG. 19 shows exemplary a process requiring a translatory movement instead of a rotary movement.

A difference resulting from the consumable design shown in FIGS. 18A-18B is that consumable 2 and cover foil 5 (FIG. 18B) need to be handled separately inside the instrument (comp. FIG. 19). A stack of consumables 22 is loaded into a supply 21. Separation wheels 86 which can be gear wheels are moving consumables 2 downwards and separate them so that a single consumable 2 can be moved onto processing unit 51. In the next step, pipette 60 applies liquids to the cavities and a fitting piece of cover foil is cut from roll 85 providing the foil. In addition to cutting the cover foil from roll 85, the foil may be stamped in a circular shape and holes may also be stamped. The following steps are similar to the ones described above for a consumable according to the disclosure. An advantage of the embodiment shown in FIG. 18 and FIG. 19 is that the cover foil 5 can be provided from a roll 85.

Figure 20A:
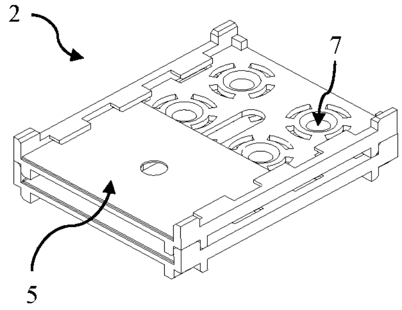
FIGS. 20A-20B show a consumable with a slidable foil.
Figure 20B:
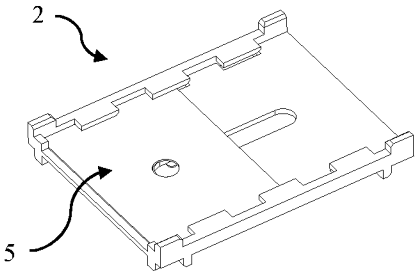

FIGS. 20A-20B show an embodiment of a consumable 2 which is not belonging to the disclosure with slidable cover foil 5. Cavities 7 of such a consumable 2 can be closed for example with a pipetting system and a disposable tip (not shown) before heat sealing. It is advantageous to use a disposable tip for avoiding contamination of the consumable.

Figure 21:
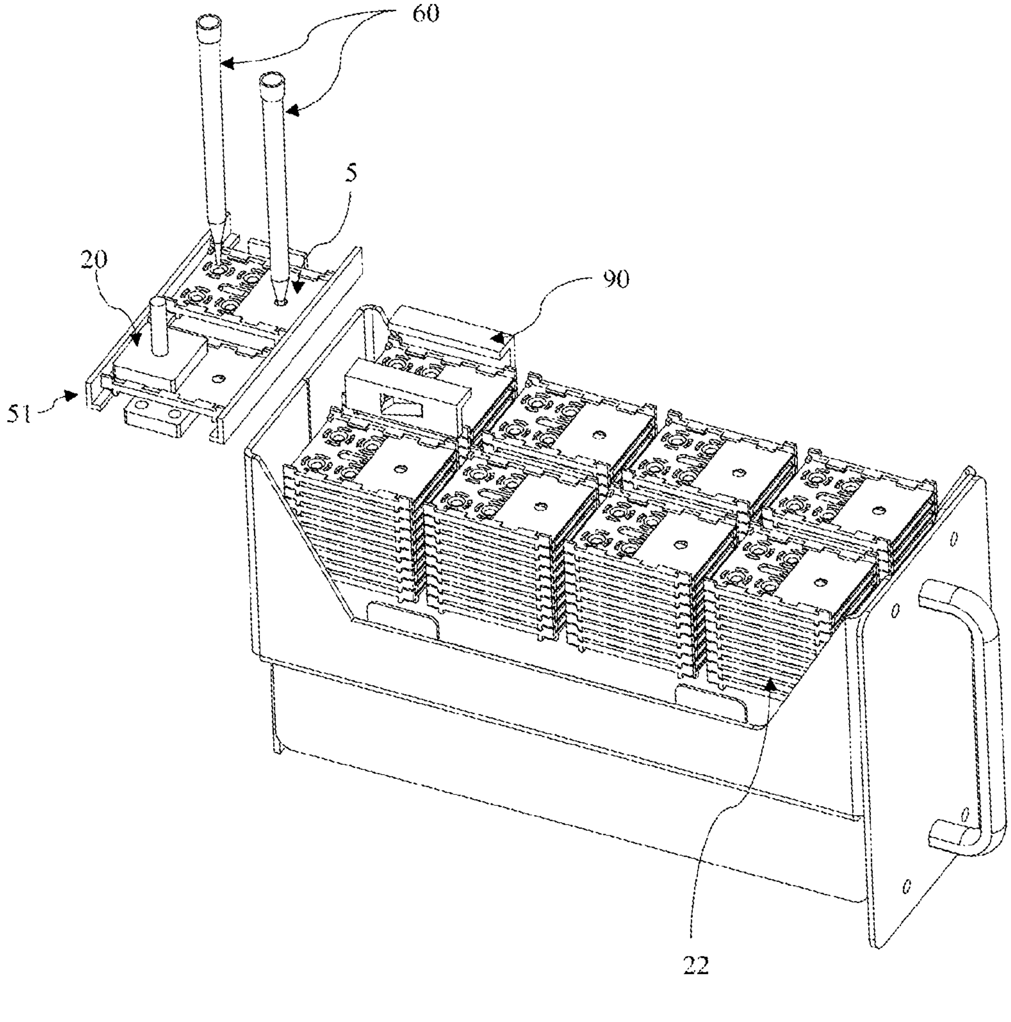
FIG. 21 depicts a process for the consumable shown in FIGS. 20A-20B with a slidable cover foil.

FIG. 21 depicts a process for the consumable 2 shown in FIGS. 20A-20B with a slidable cover foil 5 in more detail. The consumables 2 are provided in stacks 22 and may be grouped in eight stacks with ten consumables each so that a rack with the eight stacks may comprise in total 80 consumables 2. A removal gripper 90 is picking a single consumable 2 from a stack 22 and transfers it into a processing unit 51 where a pipette 60 adds a liquid to cavities 7 and slides cover foil 5 for closing the cavities. In a next step heating element 20 seals the cavities by heating cover foil 5. In a next step the consumable 2 is removed from the processing unit 51.

The foregoing description of the preferred embodiment of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiment was chosen and described in order to explain the principles of the disclosure and its practical application to enable one skilled in the art to utilize the disclosure in various embodiments as are suited to the particular use contemplated. It is intended that the scope of the disclosure be defined by the claims appended hereto, and their equivalents. The entirety of each of the aforementioned documents is incorporated by reference herein.

REFERENCE NUMERALS

2 consumable
5 cover foil
6 cover
7 cavity
8 bridge
9 border
11 hole for gripper
12 spikes
14 hook
15 rim
16 retaining element
17 hole
18 rotation gripper
19 opening cover foil
20 heating element
21 supply
22 stack of consumables
25 gripper
27 interface pin
28 longitudinal surfaces
29 strip-off shell
40 frame
45 base plate
46 ring
47 collar
50 handling feature
51 processing unit
60 pipette
66 stackable cover
69 loading unit
70 pipetting and sealing unit
71 pipetting unit
72 turning unit
73 sealing unit
80 light guiding fiber
85 roll
86 separation wheel
90 removal gripper

What is claimed is:

1. A consumable for use in an automated analyser system for performing biochemical assays, comprising a rim surrounding a plurality of cavities for receiving a fluid, wherein each cavity is connected via a flexible bridge to the rim; and a cover foil that is arranged on top of the consumable and above each opening of each cavity, wherein the cover foil comprises holes which are configured to be arranged in an open position above the openings of all cavities, wherein the cover foil is connected rotatable at and around a centrally arranged hole with the consumable such that the foil can rotate to close the openings via heat sealing.

2. The consumable of claim 1, wherein each cavity is made of a white or translucent material.

3. The consumable of claim 1, wherein the cover foil is made of a translucent material.

4. The consumable of claim 1, wherein each cavity is made of a thermally conductive material.

5. The consumable of claim 1, wherein the centrally arranged hole is configured to accommodate a gripper for taking up the consumable with an alignment cone.

6. The consumable of claim 1, wherein each flexible bridge is configured to allow a horizontal and/or vertical movement of each cavity.

7. The consumable of claim 1, wherein the cover foil has additional holes configured to accommodate spikes of a rotation gripper for rotating the cover foil from an open position to a closed position where the cover foils closes the opening of each cavity.

8. The consumable of claim 1, wherein the upper end of each cavity's openings comprises a raised border made of a heat meltable material.

9. The consumable of claim 1, wherein the foil is made of a heat meltable material, is coated with an adhesive or glue on the surface directed towards each cavity's openings.

10. The consumable of claim 1, wherein the rim comprises a snap-in feature comprising a retaining element at the bottom side of the rim and a hook arranged above the retaining element and thus above the rim.

11. A system for performing biochemical assays, comprising:

at least one consumable according to claim 1; and an automated analyser system with an element providing recesses configured to receive the cavities of the at least one consumable.

12. The system of claim 11, comprising glass fibres which are arranged above each cavity for introducing light into the respective cavity.

13. The system of claim 11, comprising a rotation gripper with spikes which are configured to engage additional holes of the cover foil for rotating the cover foil from an open position to a closed position and vice versa.

14. The system of claim 11, comprising a member for sealing the cover foil onto the consumable.

15. The system of claim 11, comprising a gripper for moving a consumable, wherein the gripper comprises an interface pin which is arranged centrally in a strip-off-shell.

16. The system of claim 15, wherein the interface pin comprises a rotation lock to prevent unintentional rotating of the consumable during handling.

17. The system of claim 16, herein the rotation lock comprises flattened longitudinal surfaces on the interface pin.

* * * * *